(12) United States Patent
Fedor et al.

(10) Patent No.: US 6,785,660 B1
(45) Date of Patent: Aug. 31, 2004

(54) E-BUSINESS BID PROCESS

(75) Inventors: James P. Fedor, Vestal, NY (US); Richard D. Forsburg, Jr., Vestal, NY (US); Robert A. Keene, Endicott, NY (US); Daniel M. McGuire, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,720

(22) Filed: Nov. 18, 1999

(51) Int. Cl.[7] .............................................. G06F 17/60
(52) U.S. Cl. .......................................... 705/37; 705/27
(58) Field of Search ............................... 705/26, 27, 37

(56) References Cited

U.S. PATENT DOCUMENTS

| | | | |
|---|---|---|---|
| 5,715,402 A | 2/1998 | Popolo | 395/237 |
| 5,787,402 A | 7/1998 | Potter et al. | 705/37 |
| 5,835,896 A | * 11/1998 | Fisher et al. | 705/27 |
| 5,845,265 A | * 12/1998 | Woolston | 705/27 |
| 6,014,644 A | * 1/2000 | Erickson | 705/26 |
| 6,161,099 A | * 12/2000 | Harrington et al. | 705/37 |
| 6,243,691 B1 | * 6/2001 | Fisher et al. | 705/26 |
| 6,266,651 B1 | * 7/2001 | Woolston | 705/26 |
| 6,272,485 B1 | * 8/2001 | Sragner | 707/1 |
| 6,393,410 B1 | * 5/2002 | Thompson | 705/37 |

FOREIGN PATENT DOCUMENTS

JP    11008728 A    *   1/1999

OTHER PUBLICATIONS

Lynne–McKeefry, "IBM taps Web for sourcing" Feb. 1999, Electrononic Buyers'News p74(1).*
Avery, Susan "Automating RFPs rids process of non–value–added activities"Jul. 1998, Purchasing v125n1 pp 202.*
Uhl, W. B. "Saving Bid Time the Floppy Disk way" Oct. 1987, IEEE Transactions on power Delivery, vol. PWRD–2, No. 4, p 1139–1140.*

* cited by examiner

*Primary Examiner*—Lynda C. Jasmin
(74) *Attorney, Agent, or Firm*—McGuireWoods LLP; William E. Schiesser

(57) ABSTRACT

Items for sale are listed on a first spreadsheet. A digital picture of an item taken by a video camera and imported to the first spreadsheet. Bids for the items are solicited from potential buyers by sending out the first spreadsheet using e mail. Buyers indicate bid amounts and quantities and return the spreadsheets. Returned spreadsheets are combined into a second spreadsheet. An optimization algorithm is executed to determine winning bids. Award sheets for each bidder are generated and sent to the bidders. A trend analysis determines which items meet a criteria for further investment.

16 Claims, 2 Drawing Sheets

E-BUSINESS BID PROCESS

TECHNICAL FIELD

The invention relates to a method and system for electronically soliciting bids for a large number of items of surplus merchandise and automatically evaluating responses to select winning bidders. More specifically the invention relates to a system permitting a seller of surplus parts to display and request bids for numerous items from a plurality of bidders who may bid on one or more of the items and thereafter evaluate all bids to optimally select winning bids to maximize revenue dollars or other business criteria. Bids are also analyzed to determine whether additional investment in surplus items is likely to result in additional revenue.

BACKGROUND OF THE INVENTION

Currently, brokers and other businesses who offer goods for sale in a "one-time" bid process manually produce a "bid offering sheet" listing the items for sale and available quantities of each. The sheet is mailed or faxed to potential bidders who typically mark by hand their bid quantities on the bid offering sheet and mail or fax it back to the seller. When the cutoff date for bids arrives, the seller looks at all the bids which have been received, one item at a time to determine the winning bid or bids. After all items have been evaluated and the winning bidders determined, the seller generates a sheet for each bidder indicating which items they have won. The entire process is very time consuming and prone to errors. In addition, it is difficult to include winning information on one item when evaluating other items such as might be desirable in order to maximize revenue from particular suppliers or to minimize shipping costs or to achieve any other optimization criteria which involves evaluating more than one item at a time.

It is also desirable for the seller to analyze current and past bids to determine buying trends. Decisions can then be made regarding surplus parts for which further investment is not justified according to various business criteria based on buying trends.

Certain steps in the current process are easily automated, such as sending bid offering sheets by e-mail rather than mail or fax. In another example, Popolo in U.S. Pat. No. 5,715,402 describes a method and system for assisting sellers and buyers of spot metals. However, no coordinated system has been developed to solve the foregoing difficulties in soliciting and evaluating bids. The lack of such a system has therefore impeded the overall flow from sellers to buyers of goods which are sold by "one-time" bids.

In accordance with the teachings of the present invention, there is defined a method and system for electronically soliciting bids for surplus merchandise and subsequently evaluating in an optimal way the responses received.

It is believed that such a system would constitute a significant advancement in the art.

OBJECTS AND SUMMARY OF THE INVENTION

It is therefore a principal object of the present invention to enhance the e-business bid process art by providing a coordinated bid system with enhanced capabilities.

It is another object to provide such a system which permits visual display of items for which bids are solicited.

It is a further object to provide such a system which permits optimal evaluation of bids received and notification of winning bidders in a facile manner.

It is yet further object to provide such a system which permits optimal evaluation of bids received and notification of winning bidders in a facile manner.

It is yet another object of the invention to provide a method for performing bid solicitation, bid evaluation, and bidder notification which is particularly adapted to e-business methods.

These and other objects are attained in accordance with one embodiment of the invention wherein there is provided a bid process, comprising the steps of listing a plurality of items for sale on a first spreadsheet, taking at least one digital picture of at least one of the plurality of items, importing at least one digital picture into the first spreadsheet, sending the first spreadsheet to bidders via e-mail, receiving a plurality of returned spreadsheets including bid amounts from the bidders via e-mail, combining the bid amounts from the plurality of returned spreadsheets into a second spreadsheet, and determining winning bids by activating a spreadsheet algorithm in the second spreadsheet.

In accordance with another embodiment of the invention there is provided a bid process comprising the steps of listing a plurality of items for sale on a first spreadsheet, taking at least one digital picture of at least one of the plurality of items, importing at least one digital picture into the first spreadsheet, sending the first spreadsheet to bidders via e-mail, receiving a plurality of returned spreadsheets including bid amounts from the bidders via e-mail, combining the bid amounts from the plurality of returned spreadsheets into a second spreadsheet, combining bid amounts from a previous plurality of returned spreadsheets received in response to a previous listing of a plurality of items for sale, into the second spreadsheet, and determining which items meet a criteria for further investment.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
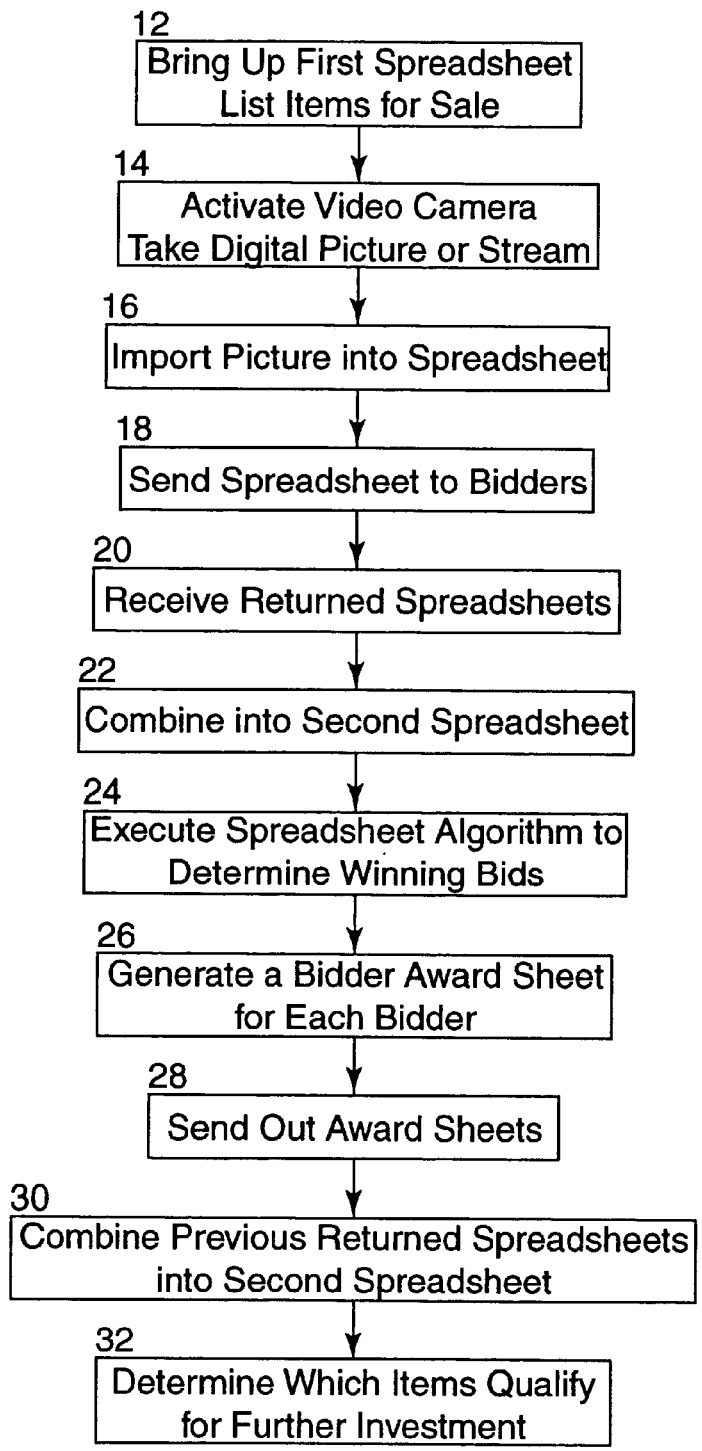
FIG. 1 is a flowchart of a bid process in accordance with the present invention.

In FIG. 1 there is shown a flowchart of steps of an e-business bid process in accordance with the present invention. A seller has a number of items which are to be offered for sale in a one-time bid procedure. The items may be any type of merchandise but are preferably various quantities of surplus items which the seller wishes to dispose of and recover the maximum revenue in return. In step 12 the seller lists the items for sale using a spreadsheet program running on a computing device. The spreadsheet program may be a general purpose one such as LOTUS 123™ (LOTUS 123 is a registered trademark of Lotus Development Corporation of Cambridge, Mass.) or MICROSOFT EXCELS (MICROSOFT EXCEL is a registered trademark of Microsoft Inc. of Redmond, Wash.) or may be a spreadsheet specially developed for this purpose. The computing device 41 in FIG. 2 may be any type of computer, personal computer, server, client, mainframe, or other computing device capable of running the first spreadsheet program of step 12 whether running locally or at a remote site. The listing of items will usually include some description of the item which is readily understandable to potential bidders and may also include the quantity of each item available for sale as well as other information of interest such as weight, location, or other details.

Figure 2:
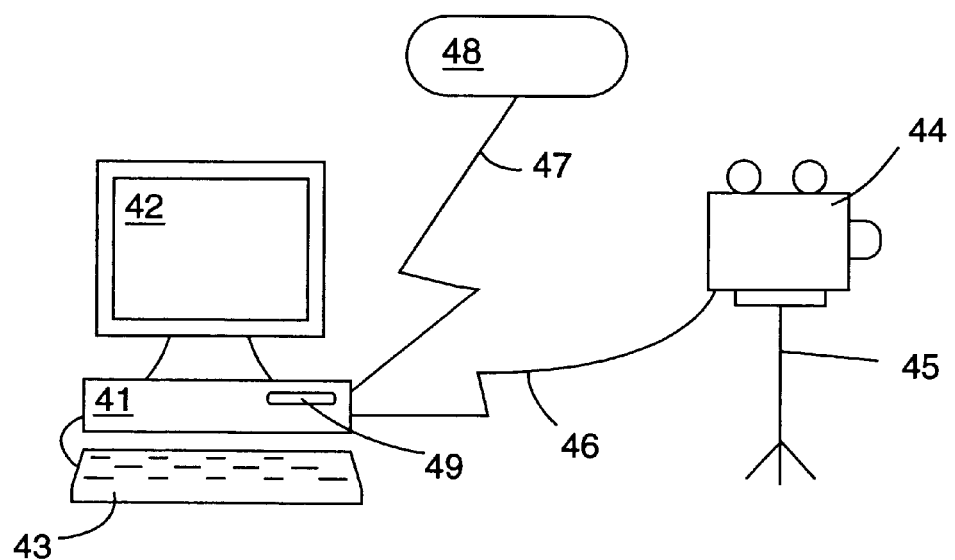
FIG. 2 is a diagram of the elements of a system for processing bids.

In step 14 a video camera 44 of FIG. 2 is activated and at least one digital picture of at least one item is taken. The camera may be capable of taking a series of pictures or a continuous stream of pictures known as a video stream or motion picture clip of an item. Video camera 44 is attached to computing device 41 by connection 46 which may be a cable attached to a serial, parallel, or Universal Serial Bus (USB) port on computing device 41. Connection 46 may also attach directly or through any other type of port. Connection 46 may also be a wireless connection such as an infrared, radio, or other type of connection known in the computing hardware arts.

The digital picture is imported into the first spreadsheet in step 16. Various techniques are known for importing a picture to a spreadsheet including entering a picture name in a cell of the spreadsheet so that, for example, it is possible to view the digital picture, whether a still picture or a video stream, by clicking on the cell position in the spreadsheet.

In step 18 the seller sends the first spreadsheet to potential buyers requesting bids for the items listed, using e-mail over a connection 47 to the Internet 48. Connection 47 may be a network connection such as token ring or Ethernet to a server attached to the Internet. It may also be a telephone connection or cable or radio connection to an Internet service provider. Usually a time period or cutoff date is specified for bid responses from the potential buyers.

Bids are received via e-mail from buyers in the form of returned spreadsheets in step 20. A buyer may have entered a bid price for the full quantity or a lesser quantity of any item listed on the first spreadsheet. A buyer may have viewed the digital picture embedded in the first spreadsheet, and if so equipped, provided feedback to adjust the digital camera such as angle or magnification in order to help identify the item or its condition and in order to decide whether and how much to bid for that item.

After the cutoff date, the returned spreadsheets which include the bid amounts and quantities are combined or imported into a second spreadsheet in step 22 using any techniques known in the art for combining spreadsheets. One such technique is to select and copy one or more columns of cells representing bid amounts or quantities from a returned spreadsheet and paste the one or more columns into pre-selected columns of the second spreadsheet. In step 24 the seller executes a spreadsheet algorithm to determine winning bids. One method of executing is to cause the spreadsheet program to perform a calculate function—e.g. by clicking on the calculate button. This action executes an algorithm stored in various cells of the second spreadsheet. The algorithm operates on the data in the second spreadsheet including quantities available, bid amounts, and bid quantities in order to maximize a business criteria function. Maximum revenue may be the criteria, however other criteria may also be included in the function such as eliminating bidders who do not meet a pre-determined minimum win dollar criteria. The algorithm may also be an iterative logic process. For example, the algorithm may compare all the bid amounts for each item and select the highest as winners. After performing this comparison for all items, go back and examine each case of a tie, and select the bidder who has won the most pieces or alternatively most items. It still a tie, select the bidder who won the most dollar volume of items. After completing this tie breaking, go back and examine each winning bidder to see if each has won enough dollar volume to exceed a minimum dollar volume threshold. If not, eliminate that bidder and go back to the beginning of the iterative process and repeat. The algorithm may also permit manual intervention by the seller for example to override or modify the business criteria function as needed.

After winning bids are determined, a bidder award sheet is generated in step 26 for each successful bidder. The bidder award sheet may list the bidder name, date, bid number, and those items which the bidder has won along with the associated quantity and total dollars for each won item, and the overall total dollars won. In step 28 the award sheets are sent to the bidders using e-mail. After receiving the award sheet, a bidder normally sends payment for the awarded items to the seller and the seller ships those items to the bidder using normal business processes which are known in the art.

It frequently occurs that a surplus item may require some investment of labor or materials in order to put it into condition to be listed for sale. The seller will want to decide whether to make this investment or just dispose of the item e.g. as scrap. In step 30, previously returned spreadsheets received in response to a previously sent first spreadsheet are combined into the second spreadsheet.

Thereafter the bids on the returned spreadsheets as well as the bids on the previously returned spreadsheets all of which are now combined in the second spreadsheet are analyzed in step 32 to determine which items qualify for further investment. Criteria for eliminating items from qualifying, include no bid over a minimum dollar limit per unit such as the required investment per unit. The criteria may be applied to several current and post bids. For example, eliminate the item if the criteria fails for the last three bids in a row. Or mark the item for further consideration if two successive bids fail and the third does not pass e.g. no bid or if no bids pass but three in a row never fail. But do not eliminate the item if two in a row fail but the third does pass. Various alternative criteria and ways of applying will be obvious to those skilled in the art.

In FIG. 2 there is shown a diagram of a system for processing bids in accordance with the present invention. Computing device 41 is described above and may include a keyboard 43 or other input devices and a display 42 or other output device. It may also include a storage device 49 such as a hard drive, floppy drive, zip drive, CD ROM or DVD drive or other device for storing programs such as a spreadsheet program and data such as the data contained in a spreadsheet. Video camera 44 capable of taking a digital picture of an item for sale is connected 46 to computing device 41 as described above. The digital camera may be mounted such as on a tripod 45 as shown or any other mounting arrangement or it may be a hand-held unit. Computing device 41 operating in conjunction with programs stored on storage device 49 can import digital pictures through connection 46. A first spreadsheet can be sent to potential bidders using e-mail on the Internet 48 via connection 47. Returned spreadsheets can also be received via connection 47. Programs on storage device 49 can combine returned spreadsheets into a second spreadsheet and can also activate a spreadsheet algorithm as described above to determine winning bids.

While there have been shown and described what are at present considered the preferred embodiments of the invention, it will be obvious to those skilled in the art that various changes and modifications may be made therein without departing from the scope of the invention as defined by the appended claims.

What is claimed is:

1. A bid process, comprising the steps of:
   listing a plurality of surplus items for sale on a first spreadsheet;
   taking at least one digital picture of at least one of said plurality of surplus items;
   importing said at least one digital picture into said first spreadsheet;
   sending said first spreadsheet to bidders via e-mail;
   receiving a plurality of returned first spreadsheets including bid amounts from said bidders via e-mail;
   combining said bid amounts from said plurality of returned first spreadsheets into a second spreadsheet; and
   determining winning bids by activating a spreadsheet algorithm in said second spreadsheet.

2. The bid process of claim 1, wherein said plurality of returned spreadsheets further include quantities of said surplus items for which said bid amounts apply.

3. The bid process of claim 1, wherein said step of determining winning bids further includes maximizing a business criteria function.

4. The bid process of claim 1, wherein said spreadsheet algorithm further comprises an iterative logic process.

5. The bid process of claim 1, wherein said step of determining winning bids further comprises eliminating bidders who do not meet minimum win dollar criteria.

6. The bid process of claim 1, further comprising the steps of generating individual bidder award sheets and sending said award sheets to said bidders respectively.

7. A bid process, comprising the steps of:
   listing a plurality of surplus items for sale on a first spreadsheet;
   taking at least one video stream of pictures of at least one of said plurality of surplus items;
   importing said at least one video stream of pictures into said first spreadsheet;
   sending said first spreadsheet to bidders via e-mail;
   receiving a plurality of returned first spreadsheets including bid amounts from amounts from said bidders via e-mail;
   combining said bid amounts from said plurality of returned first spreadsheets into a second spreadsheet; and
   determining wining bids by activating a spreadsheet algorithm in said second spreadsheet.

8. The bid process of claim 7, wherein said step of taking at least one video stream of pictures further comprises taking a live video stream of pictures.

9. The bid process of claim 8, further comprising adjusting said live video stream in response to feedback from said bidder.

10. A bid process, comprising the steps of:
    listing a plurality of surplus items for sale on a first spreadsheet;
    taking at least one digital picture of at least one of said plurality of surplus items;
    importing said at least one digital picture into said first spreadsheet;
    sending said first spreadsheet to bidders via e-mail;
    receiving a plurality of returned first spreadsheets including bid amounts from said bidders via e-mail;
    combining said bid amounts from said plurality of returned first spreadsheets into a second spreadsheet;
    combining bid amounts from a previous plurality of returned spreadsheets received in response to a previous listing of a plurality of surplus items for sale, into said second spreadsheet; and
    determining which of said plurality of surplus items and said previous listing of a plurality of surplus items meet a criteria for further investment.

11. A system for processing bids, comprising:
    means for listing a plurality of surplus items for sale on a first spreadsheet;
    means for taking at least one digital picture of at least one of said plurality of surplus items;
    means for importing said at least one digital picture into said first spreadsheet;
    means for sending said first spreadsheet to bidders via e-mail;
    means for receiving a plurality of returned first spreadsheets including bid amounts from said bidders via e-mail;
    means for combining said bid amounts from said plurality of first returned spreadsheets into a second spreadsheet; and
    means for determining winning bids by activating a spreadsheet algorithm in said second spreadsheet.

12. The system of claim 11, wherein said plurality of returned spreadsheets further include quantities of said surplus items for which said bid amounts apply.

13. The system of claim 11, wherein said spreadsheet algorithm is a business criteria function.

14. The system of claim 11, wherein said spreadsheet algorithm further comprises an iterative logic algorithm.

15. The system of claim 11, further comprising means for generating individual bidder award sheets and sending said award sheets to said bidders respectively.

16. The system of claim 11, further comprising means for importing said winning bids and winning bids from a previous plurality of returned spreadsheets received in response to a previous listing of a plurality of surplus items for sale, into a third spreadsheet and means for determining which of said plurality of surplus items and previous listing of a plurality of surplus items meet a criteria for further investment.

* * * * *